US007675032B2

(12) United States Patent
Bonn et al.

(10) Patent No.: US 7,675,032 B2
(45) Date of Patent: Mar. 9, 2010

(54) MATRIX-FREE MALDI MASS SPECTROMETRY

(75) Inventors: Günther Bonn, Zirl (AT); M. S. Muhammad Ahsan Hashir, Innsbruck (AT); Günther Stecher, Götzens (AT); Rania Bakry, Innsbruck (AT)

(73) Assignee: Leopold-Franzens-Universitat Innsbruck, Innsbruck (AT)

( * ) Notice: Subject to any disclaimer, the term of this patent is extended or adjusted under 35 U.S.C. 154(b) by 145 days.

(21) Appl. No.: 11/532,466

(22) Filed: Sep. 15, 2006

(65) Prior Publication Data

US 2008/0073507 A1 Mar. 27, 2008

(30) Foreign Application Priority Data

Aug. 25, 2006 (AT) ............................ A 1425/2006

(51) Int. Cl.
*B01D 59/44* (2006.01)
*H01J 49/00* (2006.01)

(52) U.S. Cl. ........................ 250/288; 250/281; 250/282

(58) Field of Classification Search ................. 250/288, 250/281, 287, 286, 304; 436/173
See application file for complete search history.

(56) References Cited

U.S. PATENT DOCUMENTS

| | | | | |
|---|---|---|---|---|
| 5,118,937 | A * | 6/1992 | Hillenkamp et al. | 250/288 |
| 5,832,931 | A * | 11/1998 | Wachter et al. | 128/898 |
| 5,894,063 | A * | 4/1999 | Hutchens et al. | 436/173 |
| 6,124,137 | A | 9/2000 | Hutchens et al. | |
| 6,288,390 | B1 * | 9/2001 | Siuzdak et al. | 250/288 |
| 6,958,480 | B1 * | 10/2005 | Iyer et al. | 250/340 |
| 7,105,809 | B2 * | 9/2006 | Wood et al. | 250/288 |
| 7,122,792 | B2 * | 10/2006 | Chen et al. | 250/288 |
| 2002/0144456 | A1 | 10/2002 | Degen et al. | |
| 2002/0187312 | A1 | 12/2002 | Fonash et al. | |
| 2004/0248108 | A1 * | 12/2004 | Lakshmi et al. | 435/6 |
| 2005/0023456 | A1 | 2/2005 | Frechet et al. | |
| 2005/0130222 | A1 * | 6/2005 | Lee | 435/7.1 |
| 2008/0116137 | A1 * | 5/2008 | Bonn et al. | 210/656 |

FOREIGN PATENT DOCUMENTS

WO WO 02/093170 11/2002

OTHER PUBLICATIONS

Ren, Shi-fang, Li Zhang, Zhi-hong Cheng, and Yin-long Guo. "Immobilized Carbon Nanotubes as Matrix for MALDI-TOF-MS Analysis: Applications to Neutral Small Carbohydrates." J Am Soc Mass Spectrom 16 (2005): 333-339.

(Continued)

*Primary Examiner*—Jack I Berman
*Assistant Examiner*—Brooke Purinton
(74) *Attorney, Agent, or Firm*—Workman Nydegger

(57) ABSTRACT

Particles and monoliths are used for providing an ionized analyte for mass analysis by photon desorption having a size in the range of 0.5-100 μm, wherein the particles or monoliths are modified with a chemical compound capable of absorbing photons having a wave-length of at least 300 nm. The particles and monoliths allow the use of MALDI-MS for the high throughput screening of molecules having a molecular weight lower than 700 μ without interfering signals or with only a limited number of background signals.

21 Claims, 13 Drawing Sheets

OTHER PUBLICATIONS

Shen, Zhouxin, John J. Thomas, Claudia Averbuj, Klas M. Broo, Mark Engelhard, John E. Crowell, M. G. Finn, and Gary Siuzdak. "Porous Silicon as a Versatile Platform for Laser Desorption/Ionization Mass Spectrometry." Analytical Chemistry 73(2001): 612-619.

Peterson, Dominic S., Zuanzhou Luo, Emily F. Hilder, Frantisek Svec, and Jean M. J. Frechet. "Porous polymer monolith for surface-enhanced laser desorption/ ionization time-of-flight mass spectrometry of small molecules." Rapid Commun. Mass Spectrom. 18 (2004): 1504-1512.

Kraj, Agnieszka, Tomasz Dylag, Anna Gorecka-Drzazga, Sylwester Bargiel, Jan Dziuban, and Jerzy Silberring. "Desporption/ionization on silicon for small molecules: a promising alternative to MALDI TOF." Acta Biochimica Polonica 50 (2003): 783-787.

Kinumi, Tomoya, Takumi Saisu, Mitsuo Takayama, and Haruki Niwa. "Matrix-assisted laser desorption/ionization time-of-flight mass spectrometry using an inorganic particle matrix for small molecule analysis." Journal of Mass Spectrometry 35 (2000): 417-422.

Wei, Jing, Jillian M. Buriak, and Gary Siuzdak. "Desorption-ionization mass spectrometry on porous silicon." Nature 339 (May 1999): 243-246.

Kim, Hie-Joon, Jin-Kyu Lee, Sung-Jun Park, Hyun Wook Ro, Dae Young Yoo, and Do Y. Yoon. "Observation of Low Molecular Weight Poly(methylsilsesquioxane)s by Graphite Plate Laser Desorption/Ionization Time-of-Flight Mass Spectrometry." Analytical Chemistry 72 (Nov. 2000): 5673-5678.

Ching, Jesus, Kamen I. Voivodov, and T. William Hutchens. "Surface Chemistries Enabling Photoinduced Uncoupling/Desorption of Covalently Tethered Biomolecules." J. Org. Chem. 61(1996): 3582-3583.

Anna Gorecka-Drzazga Desorption/ionization mass spectrometry on array of silicon microtips; J. Vac. Sci. Technol B.(23)2 Mar./Apr. 2005.

Lewis W. Desorption/ionization on silicon mass spectrometry: background and applications, Int Journal of Mass Spectrometry 226 (2003) 107-116.

Anna Gorecka-Drzazga Desorption/ionization mass spectrometry on porous silicon dioxide, Science Technology B (23)2, 2005, S. 819-823.

* cited by examiner

MATRIX-FREE MALDI MASS SPECTROMETRY

FIELD OF THE INVENTION

The present invention relates to particles and monoliths for providing an ionized analyte for mass analysis by photon desorption.

BACKGROUND OF THE INVENTION

Use of MALDI-MS for the analysis of small molecules, such as pharmacologically active constituents and also metabolites, is only partially possible since these molecules fall into a mass range, which usually cannot be concerned with this analysis technique. This fact is caused by the used matrix, which is normally necessary to analyse intact molecules (usually peptides, proteins). Minimum size of the analytes should therefore be 500 to 700μ, in the ideal case greater than 1000μ.

Standard systems for the screening of small molecules are gas chromatography and liquid chromatography coupled to mass spectrometry (GC-MS, LC-MS). An essential disadvantage of these systems lies in long and time consuming sample preparation steps and GC/LC-MS runs of 20 min or longer, which restricts daily throughput of samples. In contrast, MALDI-MS can reach a high automated throughput.

In the literature several examples of systems which allow a direct analysis of small molecules by MALDI-MS can be found. Within these examples a stainless steel target is used and modified so far that laser energy of 337 nm can be absorbed. This is the case for porous silicon layers (Zhang et al. Rap. Commun. Mass Spect. 2001 15 217-223; Shen et al. Anal. Chem. 2001 73 612-619; Jing Wei et al. Nature 1999 399 243-246; Kraj et al. Acta Biochimica Polonica 2003 50 (3) 783-787), but can be reached also by use of polymers (Peterson et al. Rap. Commun. Mass Spect. 2004 18 1504-1512; Frechet et al. U.S. 20050023456 A1) or by use of special modified surfaces, such as silica modified with triphenylmethane or silica modified with matrix systems like α-cyano-hydroxy cinnamomic acid (HCCA) or 2,5-dihydroxybenzoic acid (DHB) (Zhang et al. Rap. Commun. Mass Spect. 2001 15 217-223).

Immobilised carbon nanotubes are a further possibility (Shi-fang Ren et al. JASMS 2005 16 (3) 333-339) next to graphite (Hie-Joon Kim et al. Anal. Chemical 2000 72 5673-5678) or a combination of sample with inorganic particles, such as Mn, Mo, Si, Sn, $TiO_2$, W, $WO_3$, Zn, ZnO (Kinumi et al. J. Mass Spectr. 2000 35 417-422). Fonash et al. disclose in their patent application the use of amorphous silicon-layers and porous $SiO_2$-layers for the matrix free MALDI-MS (Fonash et al. WO 02/093170 A1, US20020144456). Hutchens describes the use of azodianiline for the immobilisation of biomolecules by means of photolabile attachment (Ching et al. J. Org. Chem. 1996 61 3582-3583; Hutchens et al. U.S. Pat. No. 6,124,137).

Within this last cited patent a clear division between photolabile attachment and matrix free MALDI-MS is given: For matrix free MALDI-MS immobilized matrices such as HCCA or DHB were used, whereas for photo-labile attachment azodianiline is described.

The object of the present invention is therefore to provide a system which allows to use MALDI-MS for the high throughput screening of molecules having a molecular weight lower than 700μ (lowest measured mass is sodium with m/z=23, FIG. 15), e.g. for pharmacologically active compounds as well as for drug metabolites and for secondary plant metabolites. Additionally, the system should be suitable also for target compounds in the range up to several 1000μ. As most of described and published systems show dominant background signals, a further object is the establishment of a system without interfering signals or with a limited number of background signals.

BRIEF SUMMARY OF THE INVENTION

The above objects are achieved in accordance with the invention by using particles and monoliths of the initially described kind, wherein said particles or monoliths are modified with a chemical compound capable of absorbing photons having a wave-length of at least 300 nm, with the proviso that said analyte is not chemically linked to said organic compound. The analyte is adsorbed on the particles and monoliths.

According to a preferred embodiment, said particles or monoliths are porous.

In accordance with a further embodiment, the particles have a size in the range of 0.5-100 μm, preferred in the range of 10-80 μm, more preferred in the range of 35-70 μm.

Another preferred embodiment is characterized in that the particles have pores with a pore size in the range of 60-4,000 Å, more preferred 800-3,000 Å, most preferred 900-1,100 Å.

According to an embodiment of the invention, said particles and monoliths are silica.

In accordance with another embodiment, said particles are made of cellulose, sugar, carbohydrates, agarose, dextrane, derivatives thereof, an organic polymer, styrene, divinyl benzene and (meth)acrylate and derivatives thereof, $TiO_2$, $ZrO_2$, $In_2O_3$ and diamond.

Suitably, said chemical compound capable of absorbing photons having a wave-length of at least 300 nm is azodianilin and/or stilbene or a derivative thereof.

According to another aspect of the present invention, an apparatus for providing an ionized analyte for mass analysis by photon desorption is provided, comprising a target carrying a particle or a monolith as described above.

The present invention further provides a method for providing an ionized analyte for analysis of mass comprising providing an apparatus as described above, contacting an amount of an analyte with said particles or monolith, and irradiating said particles or said monolith to desorb and ionize said analyte.

The present invention will now be described in further detail by way of drawings with the following examples.

EXAMPLES

Silica particles of 35-70 µm and 1000 Å are chosen as basis material. This basis material is modified with a azodianiline-system, showing an absorption maximum in the range of λ>300 nm.

1. Purification and Activation of Silica Gel 1 g silica gel (irregular silica: 35-72 µm, 1000 Å, Grace Vydac, Columbia, Md., USA; regular silica: 5 µm, 60 Å, 120 Å, 300 Å, 1000 Å from Grom Analytik, Rottenburg-Hailfingen, Germany) was activated and purified by washing twice with 5 mL 20% $HNO_3$ (65% purity, Sigma, St. Louis, Mo., USA), 0.5 M NaCl (analytical grade, Sigma), $H_2O$, acetone (analytical grade, Sigma) and diethyl ether (analytical quality, Merck, Darmstadt, Germany), respectively. Afterwards material was placed into a beaker, placed in an exsiccator and dried under reduced pressure for 4 hrs at 150° C.

Figure 1:
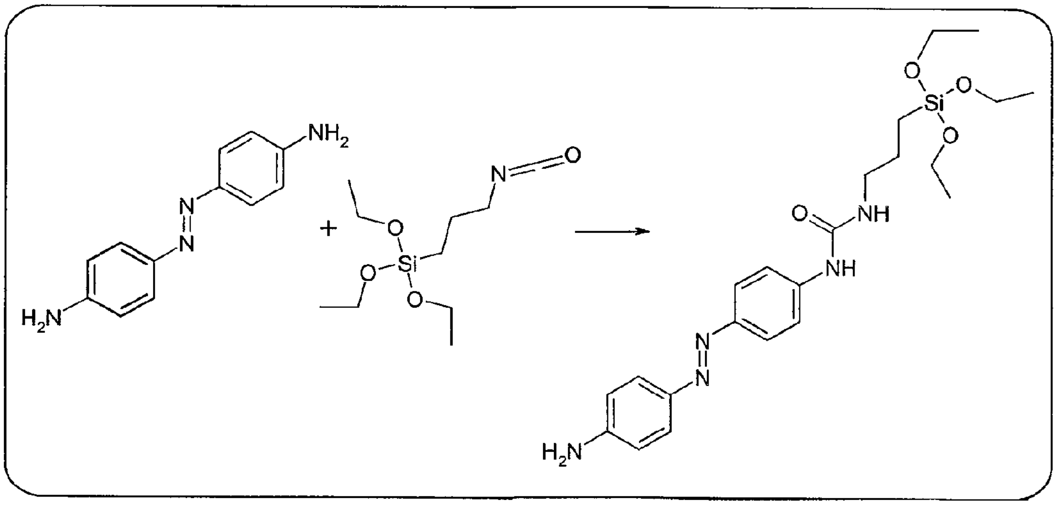
FIG. 1 illustrates the reaction between azodianiline and a triethoxysilanederivative. Modification of one or both free amino groups depends on the molar ratio of educts.

2. Reaction of 4,4'-azo-dianiline with γ-isocyanatopropyl-triethoxy silane 0.98 g of 4,4'-azo-dianiline (95% purity, Acros Organics, Geel, Belgium) were combined with 2.35 g of γ-isocyanatopropyl-triethoxy silane (analytical grade, Sigma) and 12 ml of dry tetrahydrofuran (analytical grade, Sigma) in a round bottom flask. The mixture was refluxed for 24 hours with stirring (magnetic stirrer) at 75° C. under room light. A needle like yellow precipitate was obtained, centrifuged, washed with 10 ml hexane thrice and dried under reduced pressure in an exsiccator. FIG. 1 displays the mono-derivatised (one amino function) form. Next to this form also the di-derivatised (both amino functions) form is possible (FIG. 1), depending on the molar ratio of the educts. To ensure the availability of free amino groups on the surface of the material for preconcentration of metabolites and sugars the synthesis of the azodianiline silica was modified: All steps were performed as already described with exception of step 2, where the employed amount of γ-isocyanatopropyl-triethoxy silane was reduced to 1.17 g.

Figure 2:
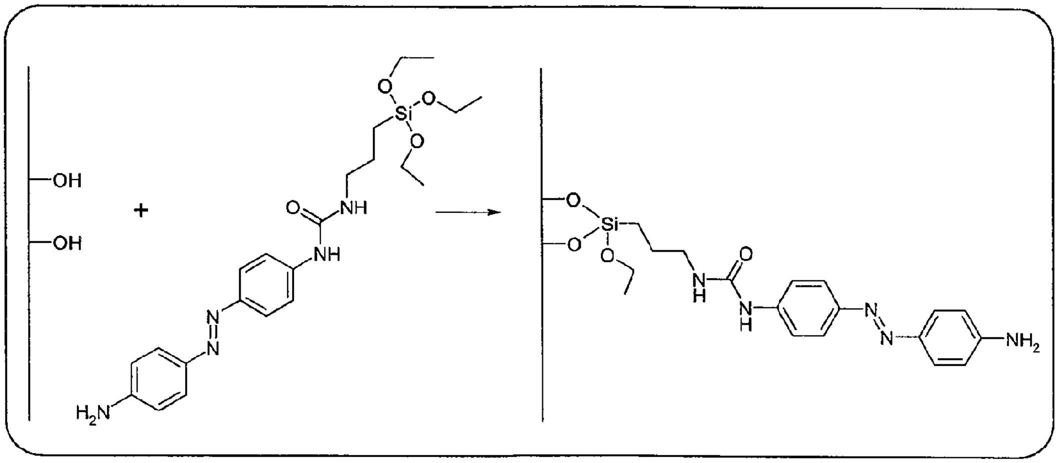
FIG. 2 illustrates immobilisation of the azodianiline-derivative to the silica particle. Depending on the molar ratio between educts shown in FIG. 1, coupling on one or both sides to the silica surface is possible.

3. Synthesis Of Final Product 0.5 g product of step 2 were placed in a round bottom flask, dissolved in 10 ml of dry tetrahydrofuran and combined with 0.5 g of silica gel from step 1. 200 µl of n-propylamine (extra pure, Acros Organics) were added as catalyst. The mixture was refluxed at 75° C. for 16 hours with stirring (magnetic stirrer), centrifuged and washed first with tetrahydrofuran to remove unreacted material, and then with 10 ml of methanol twice (analytical quality, Sigma). Finally the material was transferred into a beaker, placed in an exsiccator and dried under reduced pressure. FIG. 2 shows the mono-coupled modification. Depending on step 2 the twice coupled modification is possible.

MALDI-TOF-MS Analysis:

Sample Preparation on Target

On target sample preparation of azodianiline modified silica particles was preformed by preparing a suspension with methanol (analytical quality, Sigma). 10 mg modified silica gel was suspended in 1 ml methanol and sonicated for 3 minutes. For MALDI-TOF measurements 1 µl of the suspension was applied on a stainless steel target and dried at room temperature resulting in a thin layer of modified silica material. On this layer 1 µl of sample solution was placed and dried with nitrogen air.

Preparation of sample solutions: Sugars, their degradation products and amino acids were dissolved in pure water (0.5 mg/ml) and deoxycholic acid and 1,2-diheptadecanoyl-sn-Glycero-3-[Phospho-rac-(1-glycerol)] (sodium salt) in methanol.

Instrumentation

All experiments were performed on a MALDI mass spectrometer (Ultraflex MALDI TOF/TOF, Bruker Daltonics, Bremen, Germany) employing stainless steel targets (MTP 384 target ground steel TF, Bruker Daltonics). Desorption was obtained by using a 337 nm nitrogen laser and laser energy was adjusted as needed. Voltage impressed on the ion source 1 and 2 was 20.0 and 18.6 kV, respectively. Detection voltage was set at 1601 V. Flex Control V 2.0 was used for parameter control during recording; Flex Analysis V 2.0 was used for data evaluation.

Results

Figure 3:
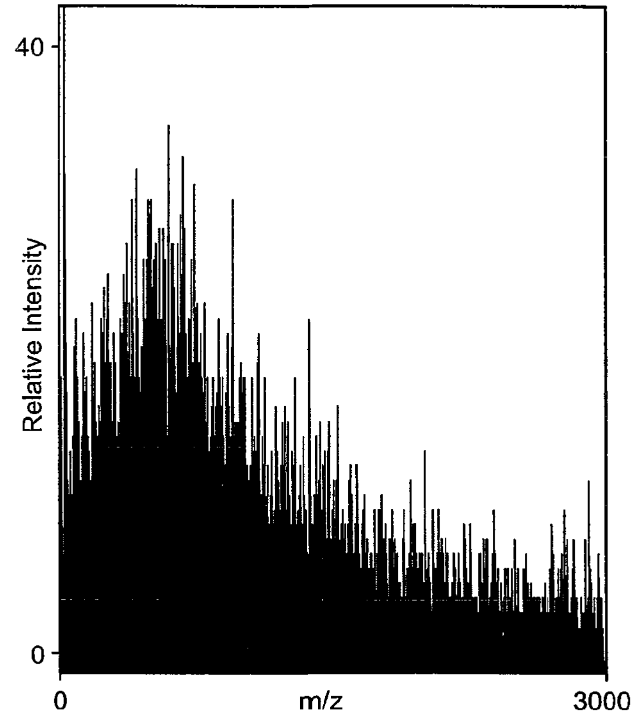
FIG. 3 shows the matrix free MALDI-MS spectrum of the produced azodianiline silica.
Figure 4:
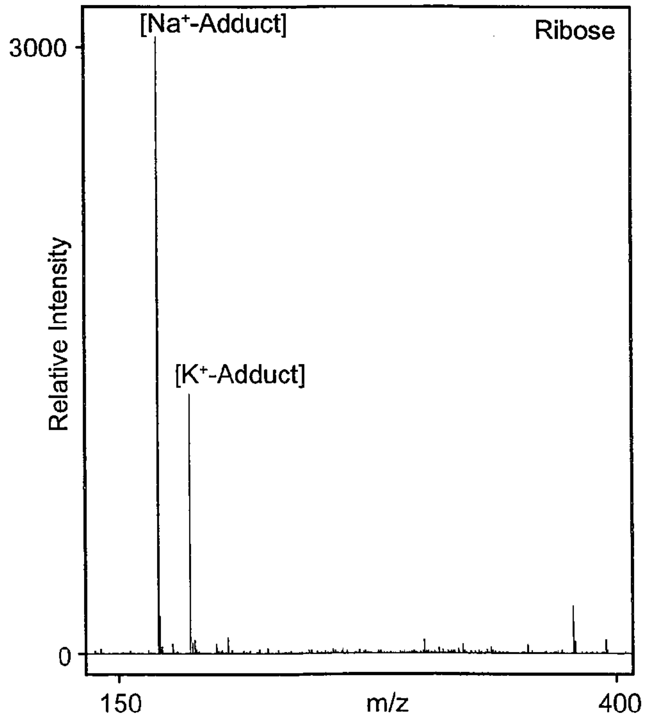
FIG. 4 shows the matrix free MALDI-MS spectrum of ribose using azodianiline silica. Spectrum corresponds sum of 500 laser shots; concentration: 1 μg on target.
Figure 5:
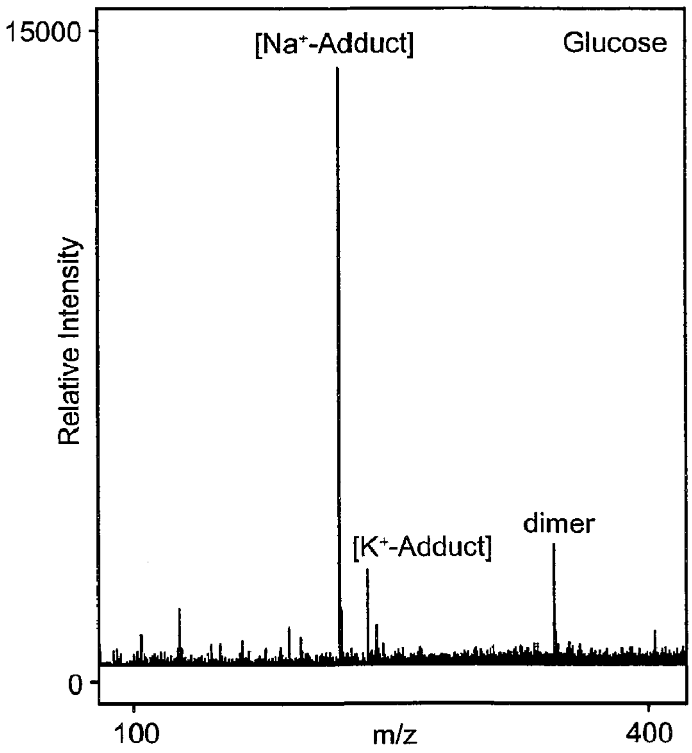
FIG. 5 shows the matrix free MALDI-MS spectrum of glucose using azodianiline silica. Spectrum corresponds sum of 500 laser shots; concentration on target 1 μg.
Figure 6:
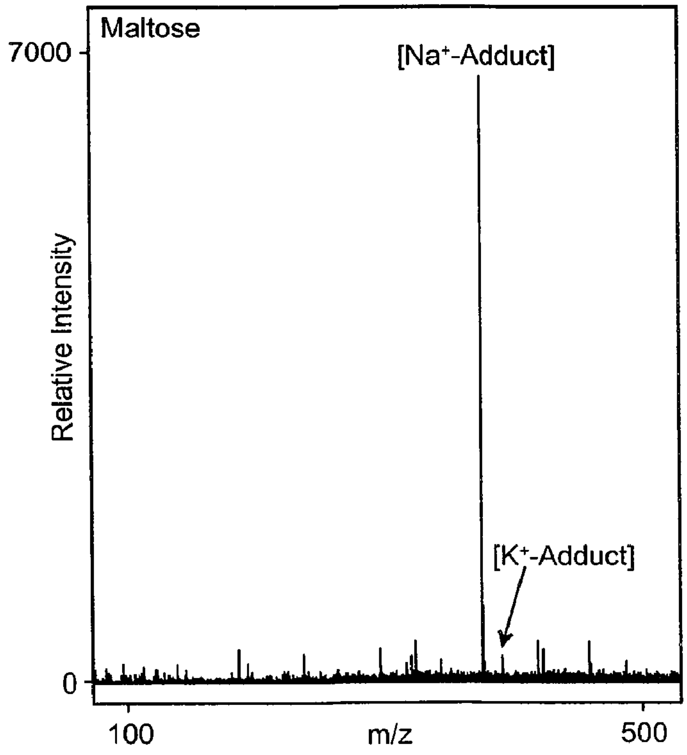
FIG. 6 shows the matrix free MALDI-MS spectrum of maltose using azodianiline silica. Spectrum corresponds sum of 500 laser shots; concentration on target 1 µg.
Figure 7:
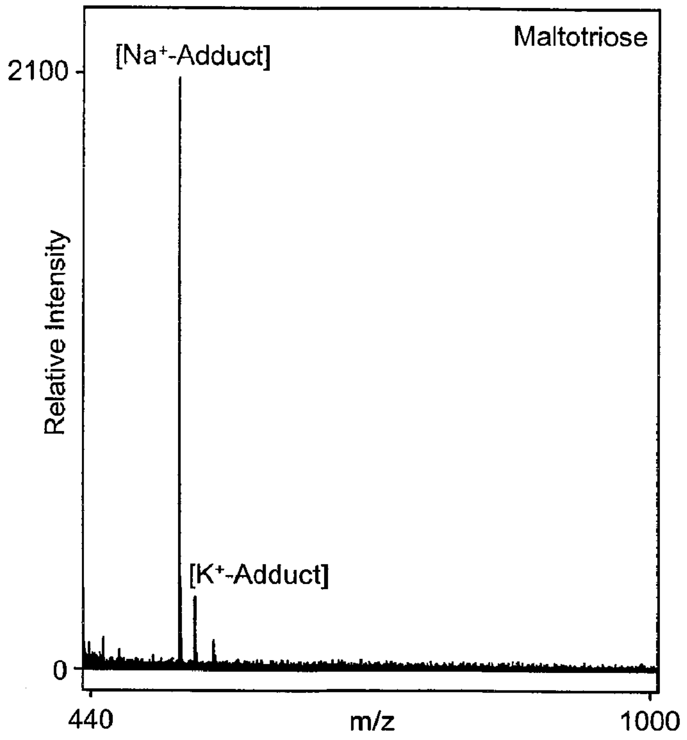
FIG. 7 shows the matrix free MALDI-MS spectrum of maltotriose using azodianiline silica. Spectrum corresponds sum of 500 laser shots; concentration on target 1 µg.
Figure 8:
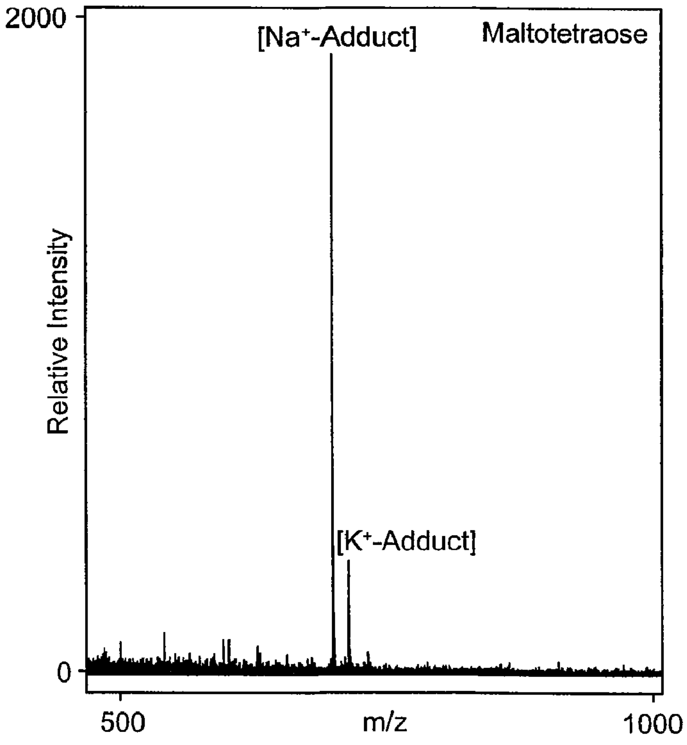
FIG. 8 shows the matrix free MALDI-MS spectrum of maltotetraose using azodianiline silica. Spectrum corresponds sum of 500 laser shots; concentration on target 1 µg.
Figure 9:
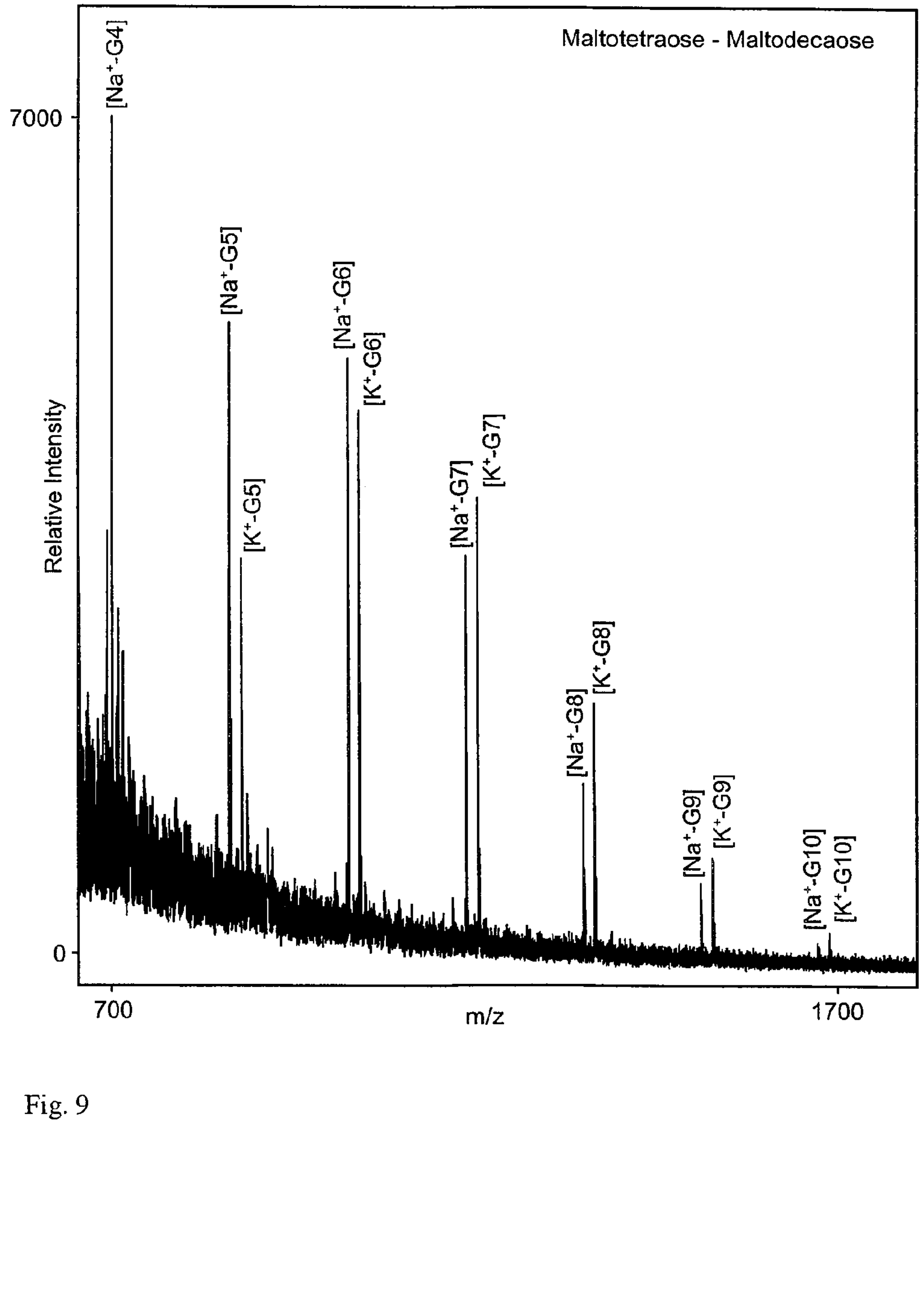
FIG. 9 shows the matrix free MALDI-MS spectrum of glucoseoligomers from G4 to G10 using azodianiline silica. Spectrum corresponds sum of 700 laser shots; concentration on target 1 µg.

Direct analysis of the produced material shows only noise in the MALDI-MS (FIG. 3). This is an important result, as it proves that no dominant background signals are produced. The performance concerning matrix free MALDI-MS is finally proved by analysis of ribose, a carbohydrate, which under normal conditions can not be detected. FIG. 4 shows the mass spectrum of ribose applying 1 μL of standard on the target (finally 1 μg of pure substance on the target). The detected signals correspond to the sodium and the potassium adduct of ribose. Further on glucose (FIG. 5), sucrose, maltose (G2, FIG. 6), maltotriose (G3, FIG. 7), maltotetrose (G4, FIGS. 8 and 9), and glucose oligomers up to G10 were investigated (FIG. 9). Next to the optimal performance of the established system in the low molecular mass region, the excellent signal to noise ratio from higher sugars has to be pointed out, as these systems show also problems when analysing them with matrix. A further observation was the higher signal intensity obtained when using the azodianiline system (e.g.: glucose with azodianiline silica delivered a relative intensity of 15000, using covalently bound DHB on silica only 5000).

Figure 10:
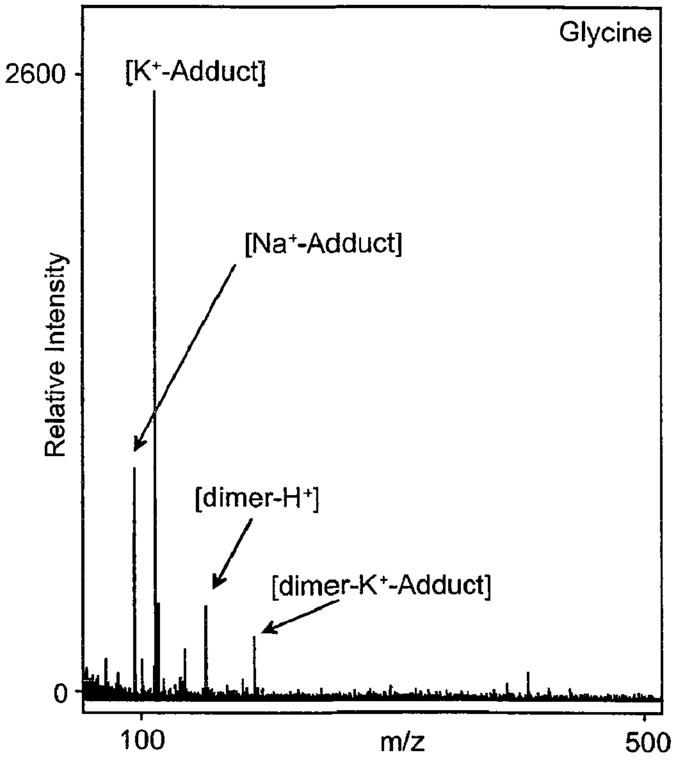
FIG. 10 shows the matrix free MALDI-MS spectrum of glycine using azodianiline silica. Spectrum corresponds sum of 500 laser shots; concentration on target 1 µg.
Figure 11:
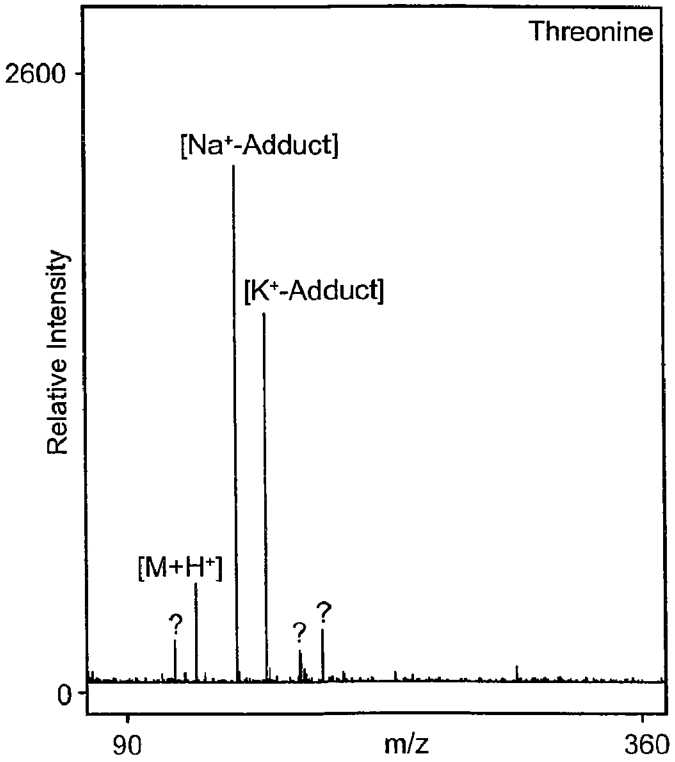
FIG. 11 shows the matrix free MALDI-MS spectrum of threonine using azodianiline silica. Spectrum corresponds sum of 500 laser shots; concentration on target 1 µg.
Figure 12:
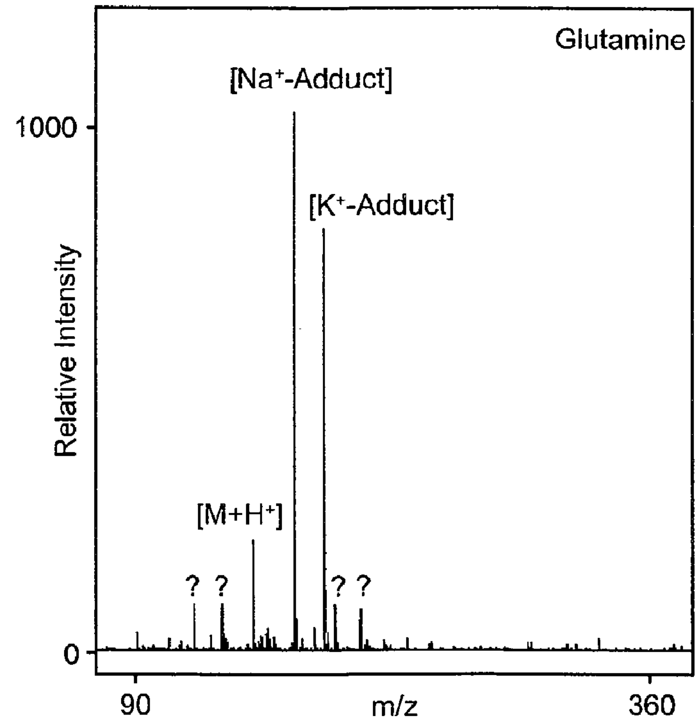
FIG. 12 shows the matrix free MALDI-MS spectrum of glutamine using azodianiline silica. Spectrum corresponds sum of 500 laser shots; concentration on target 1 µg.

The analysis of amino acids revealed that single standards are detected in the protonated form next to the sodium and potassium adducts. Glycin, threonin and glutamine should serve as an example (FIG. 10-12).

Figure 13:
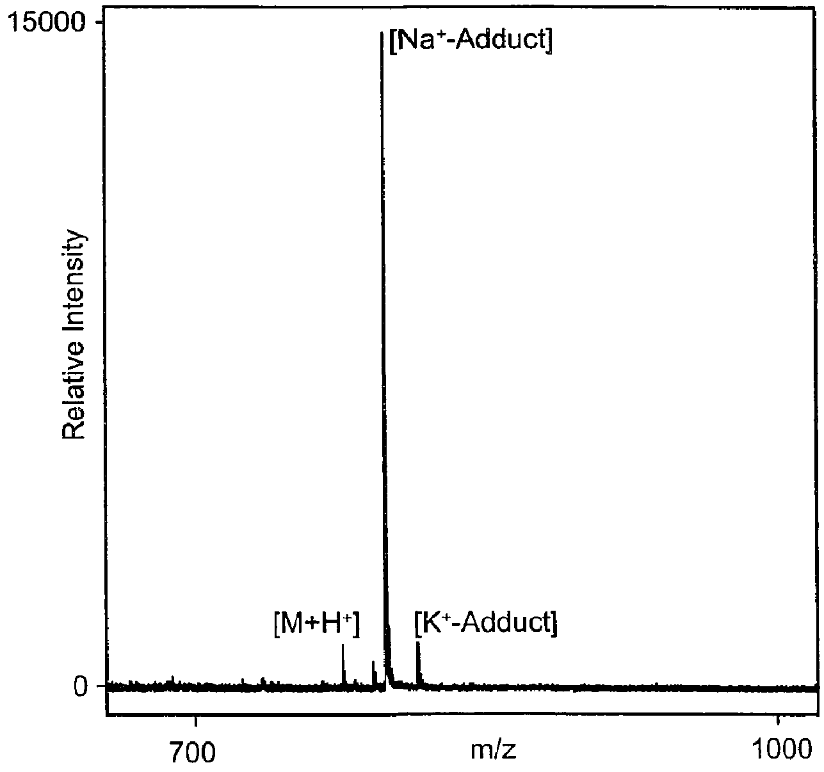
FIG. 13 shows the matrix free MALDI-MS spectrum of the metabolite 1,2 diheptadecanoyl-sn-glycero-3-(phospho-rac-(1-glycerol)) using azodianiline silica. Spectrum corresponds sum of 500 laser shots; concentration on target 10 ppm.

Analysis of typical metabolites used for diagnostic tests were performed for phenylalanine, deoxycholic acid and the phospholipid 1,2 diheptadecanoyl-sn-glycero-3-(phospho-rac-(1-glycerol)) (FIG. 13). All three types of metabolites could be detected without problems at a concentration of 50 to 10 ppm. Limit of detection was not investigated in this coherence.

Figure 14:
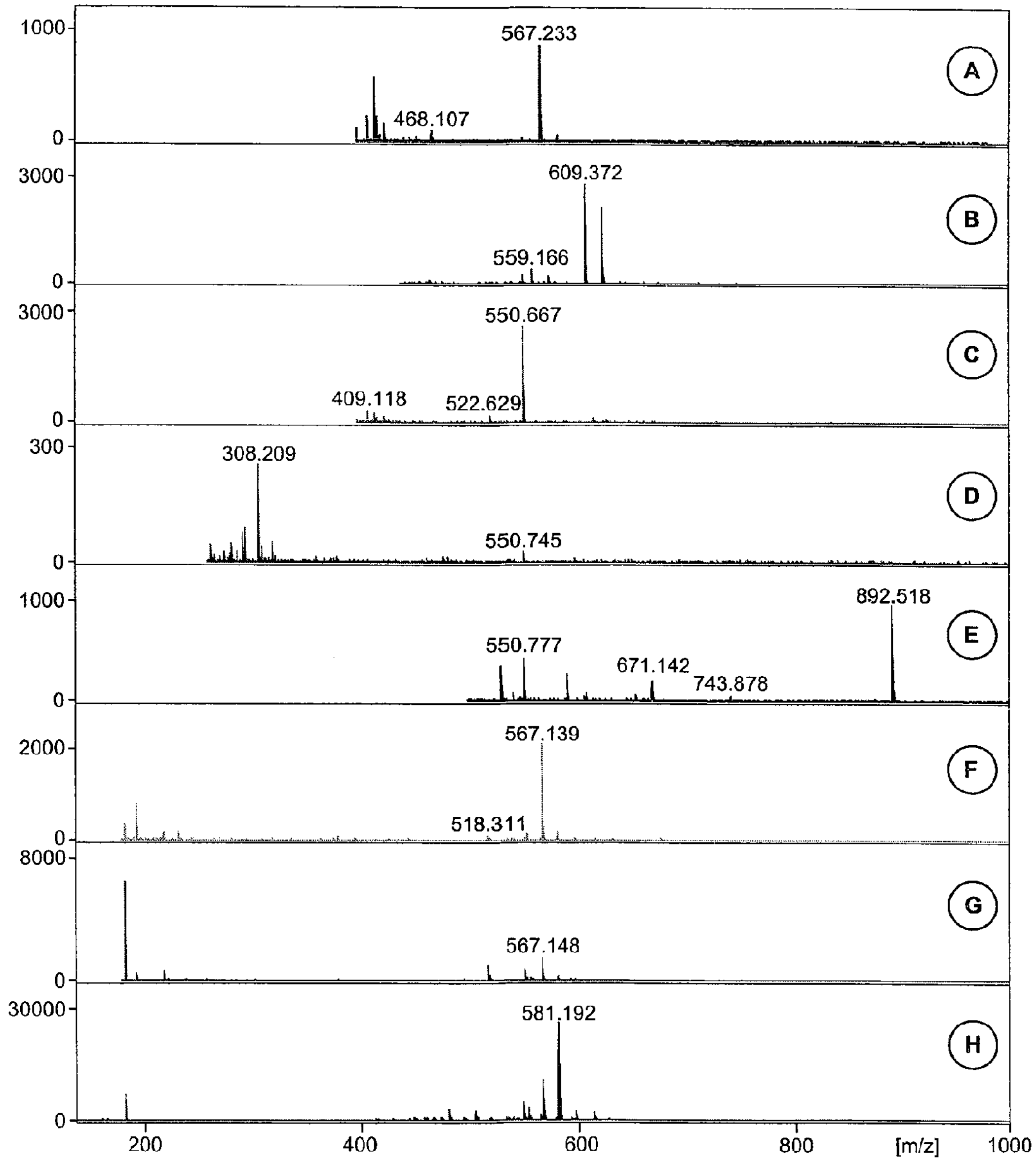
FIG. 14 shows the matrix free MALDI-MS spectrum of *Taxus* standards and plant extraxt using azodianiline modified silica (A=deacetylbaccatin III (standard), b=baccatin III (standard), C=cephalomannine (standard), D=paclitaxel ("old" standard), E—paclitaxel ("new" standard), F, G=purified *Taxus* extracts, H=*Taxus* raw extract).

The analysis of the standards 10-deacetylbaccatin and baccatin III via matrix free MALDI-MS delivered sodium and potassium signals as already noticed with the analysis of sugars. In the case of paclitaxel and cephalomannine standards only fragments could be detected. FIG. 14D shows the MALDI-TOF-MS spectrum of a paclitaxel standard (7 days old, stored at 8° C.). The dominant signal at m/z 308 corresponds to the side chain of paclitaxel (sodium signal), the signal at m/z 550 to the deacetylated ring-system (potassium signal). Interestingly freshly prepared paclitaxel standard delivered a sodium and a potassium signal for the intact molecule (FIG. 14E). The same instability and tendency could be confirmed using an HPLC-iontrap-MS system for analysis.

To test the efficiency of the developed system, a *Taxus baccata* water-methanol extract was analysed by matrix free MALDI-MS. Next to taxol (or paclitaxel) also the precursor ions of it were of main interest, e.g. 10-deacetylbaccatin, cephalomannine and baccatin III. These precursors can be isolated from needles of the plant and derivatised in vitro into the pharmaceutically needed paclitaxel. The analysis of freshly prepared raw extract showed a clear sodium signal for 10-deacetlybaccatin. Beside some other signals, i.e. precursors of paclitaxel and fragments of them could be detected (FIG. 14F, G, H).

Figure 15:
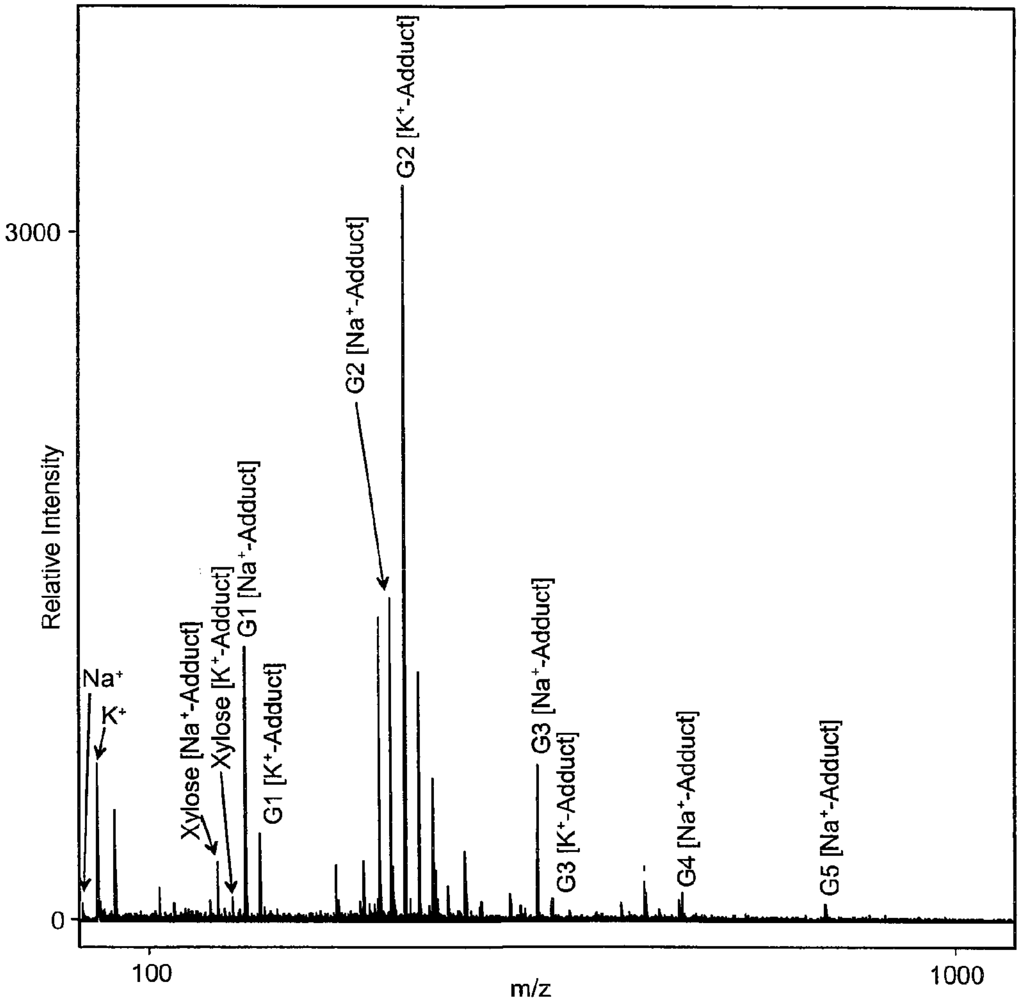
FIG. 15 shows the matrix free MALDI-MS spectrum of partially hydrolyzed wheat straw using azodianiline silica. Spectrum corresponds sum of 500 laser shots.
Figure 16:
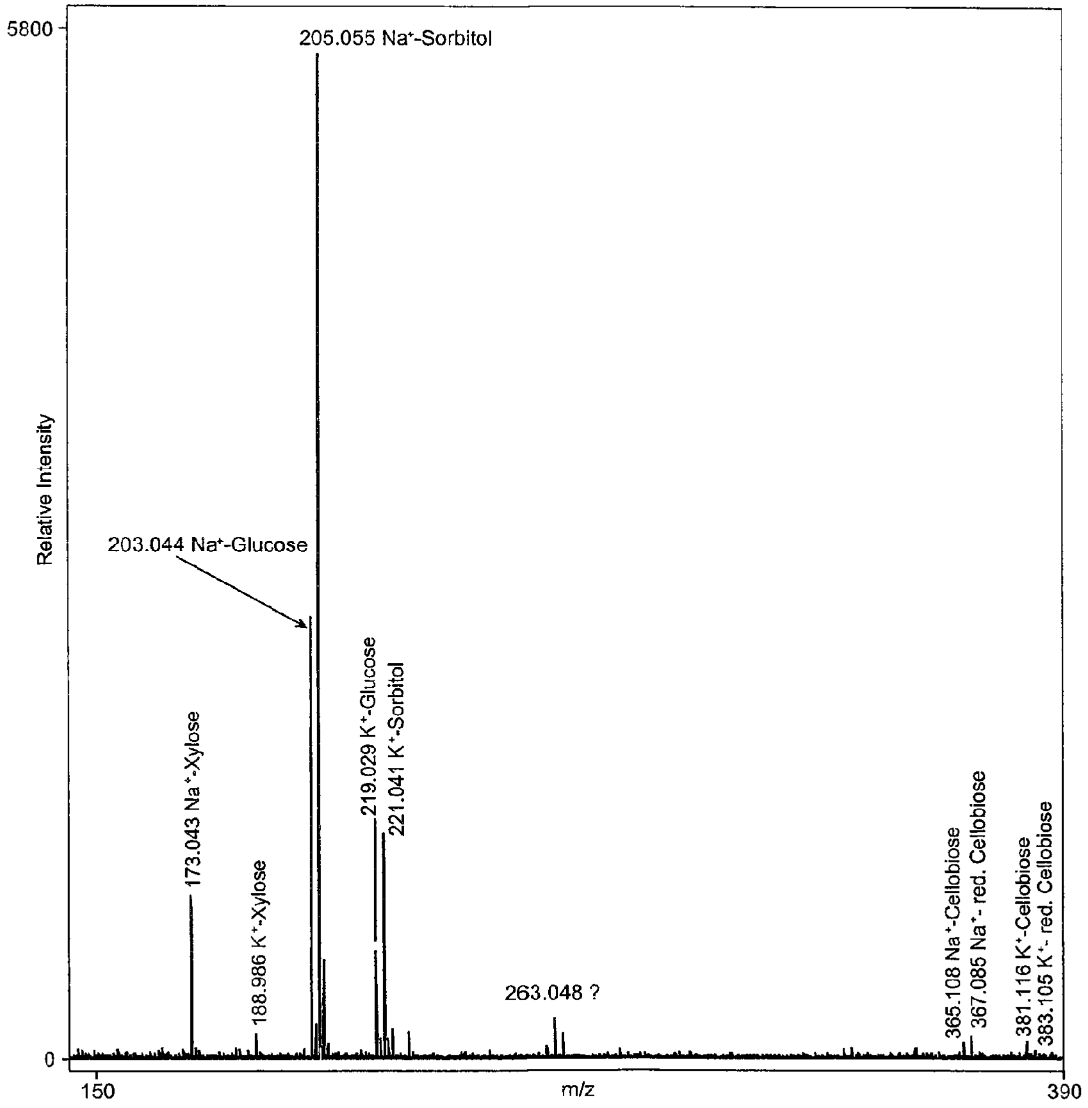
FIG. 16 shows the matrix free MALDI-MS spectrum of wheat straw after Aquasolv® and after enzymatic digestion using azodianiline silica. Spectrum corresponds sum of 500 laser shots.

A farther example is the analysis of hydrothermally treated wheat straw (FIG. 15). Wheat straw was decomposed and solubilised by a special treatment called Aquasolv®. Within this process the plant material is treated first with steam (p=17 bars), and later with hot water. Finally the obtained fractions were digested enzymatically. Analyses of the partially hydrolyzed sample (with sulphuric acid, sample A) and after Aquasolv® and enzymatic treatment (sample B) by matrix free MALDI-MS are shown in FIGS. 15 and 16. Measuring sample A signals for a hexose, a disaccharide, tri-, tetra- and penta-saccharide were obtained (FIG. 15). Sample B delivered signals for xylose, glucose, sorbitol, cellobiose and reduced cellobiose (FIG. 16). All of them were detected as sodium and potassium signals. Xylose, glucose and cellobiose are monomeric units resulting from complete hydrolysis of wheat straw. Sorbitol and reduced cellobiose are produced by the treatment of the sample at high temperature and high pressure (during Aquasolv®). As expected, no higher sugars could be detected.

Figure 17:
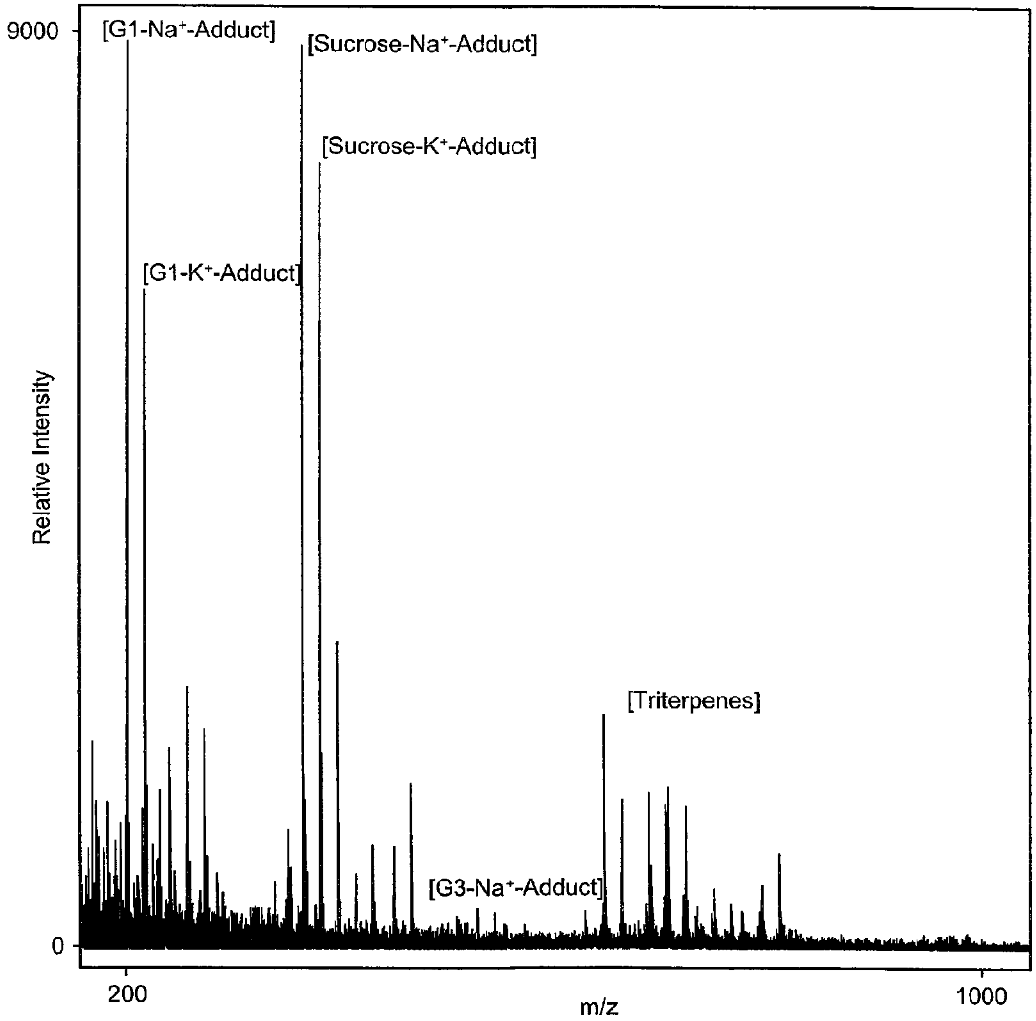
FIG. 17 shows the matrix free MALDI-MS spectrum of *Cimicifuga racemosa* crude extract (prepared with 50% ethanol, dried and redesolved in water).

*Cimicifuga racemosa* extracts are very complex, but rich in carbohydrates and in a special form of triterpenes, so called saponins. Extracting *Cimicifuga racemosa* with different extraction solvents like water, acetone, ethanol or diethylether and measuring them via matrix free MALDI-MS delivered dominant signals for carbohydrates for the water fraction and dominant signals for triterpenes for the acetone fraction. The water fraction showed also relative small signals for triterpenes, present in low concentration owing to the worse solubility in this solvent (FIG. 17).

Figure 18:
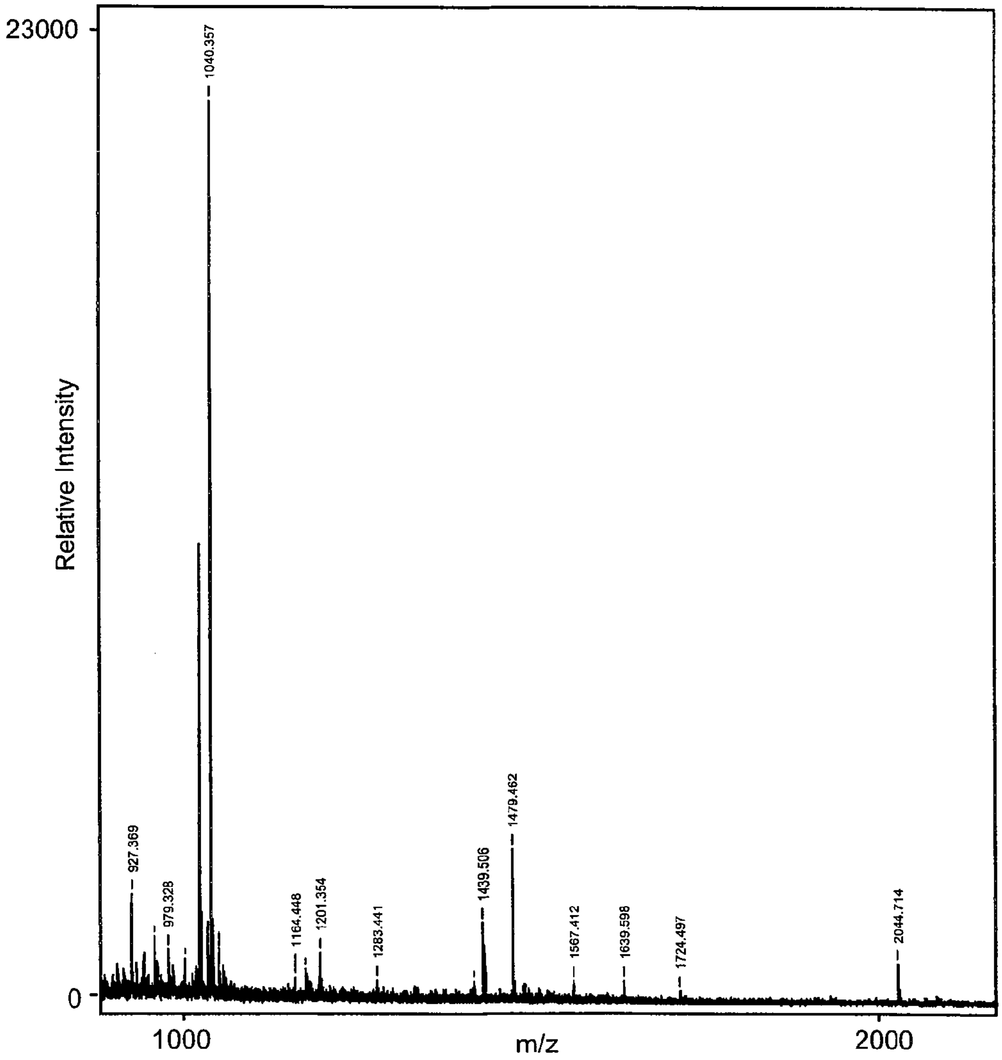
FIG. 18 shows the matrix free MALDI-MS spectrum of a BSA digest using azodianiline silica.

Generally during measurements it could be noticed that nearly every type of ionisable molecule can be analysed and detected. Only proteins and peptides did not deliver signals in the first trials. After system optimization by means of optimizing accelerating voltage and detection voltage peptides of a BSA digest could be detected without adding matrix. Biomolecules such as proteins could not be analysed (FIG. 18).

Figure 19:
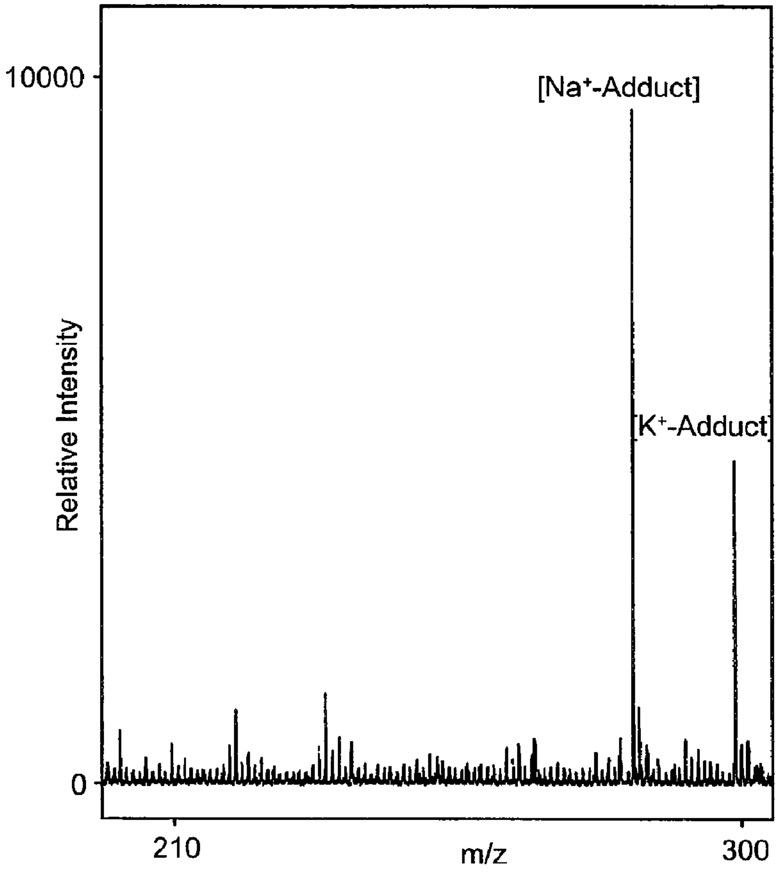
FIG. 19 shows the matrix free MALDI-MS spectrum of an enriched sample of glucose-6-phosphate on modified azodianiline silica (type of modification: iminodiacetic acid $Fe^{3+}$).

Further modification of the produced material for selective preconcentration and subsequent matrix free MALDI-MS analysis was performed by introducing iminodiacetic acid on the free amino function of the azodianiline through reaction with n-BuLi and sodium chloroacetate. From literature it is known, that iminodiacetic acid immobilized $Fe^{3+}$ shows high affinity to phosphate groups and therefore to phosphorylated systems. Therefore glucose-6-phosphate standard solution was combined with the high affinity material. After intensive washing the material was taken for matrix free MALDI-MS measurement. The resulting mass spectrum is displayed in FIG. 19, showing sodium and potassium signals of the target compound. Another example is the selective preconcentration of carbohydrates. This can be performed by immobilising boronic acid and boronic acid derivatives on the stationary phase.

The combination of thin layer chromatography (TLC) to MALDI-MS is nearly not possible, because of problems with desorption and ionization of target molecules. In literature several examples concerning the hyphenation of TLC-MALDI-MS are given. Within those examples matrix is added directly to the mobile phase of TLC before development or is sprayed onto the TLC plate after development of the separation system. Nevertheless several problems are faced during the whole procedure, especially as mentioned already with desorption and ionization.

Placing the produced azodianiline silica particles onto a glass plate (by spraying or as suspension) TLC separation of complex mixtures can be performed. The direct matrix free MALDI-MS analysis afterwards is possible without negative interferences. A main and important outcome of experiments with TLC-MALDI-MS is the fact, that thin layers deliver signals with higher intensity than thicker layers. Therefore an optimization of the system is performed by covalently binding unmodified silica particles onto a glass plate. To this monolayer finally the azodianiline is coupled enabling matrix free working for MALDI-MS.

Investigating the limit of detection of produced material several concentrations of xylose were applied onto the system and analysed with matrix free MALDI-MS. Limits of detections achieved were 70 fmol.

The invention claimed is:

1. A non-matrix composition for providing an ionized analyte for mass analysis by photon desorption, said composition comprising:

a plurality of particles and/or a monolith, wherein at least one of said particles or monolith are modified with an organic compound capable of absorbing photons having a wave-length of at least 300 nm, wherein said analyte is not chemically linked to said organic compound, wherein said organic compound capable of absorbing photons having a wave length of at least 300 nm is at least one of azodianilin, stilbene, or a derivative thereof.

2. A composition according to claim 1, wherein said particles and/or monolith are porous.

3. A composition according to claim 1, wherein the particles have a size in the range of about 0.5-100 μm.

4. A composition according to claim 1, wherein pores of the particles have a pore size in the range of about 60-4,000 Å.

5. A composition according to claim 1, wherein said particles and/or monolith are comprised of silica.

6. A composition according to claim 1, wherein said particles and/or monolith are comprised of at least one of cellulose, sugar, carbohydrates, agarose, dextran, derivatives thereof, an organic polymer, styrene, divinyl benzene and (meth)acrylate and derivatives thereof, $TiO_2$, $ZrO_2$, $In_2O_3$ and diamond.

7. A composition as in claim 1, wherein the composition includes a plurality of particles and is devoid of a monolith.

8. A composition as in claim 7, wherein the plurality of particles include said organic compound capable of absorbing photons having a wavelength of at least 300 nm disposed thereon, said organic compound is at least one of azodianilin, stilbene, or a derivative thereof.

9. A composition as in claim 8, wherein the organic compound is in a mono-derivatised form.

10. A composition as in claim 8, wherein the organic compound is covalently bonded to the particle.

11. A composition as in claim 1, wherein the composition includes a monolith and is devoid of particles having the organic compound.

12. A composition as in claim 11, wherein the monolith includes said organic compound capable of absorbing photons having a wavelength of at least 300 nm disposed thereon, said organic compound is at least one of azodianilin, stilbene, or a derivative thereof.

13. A composition as in claim 12, wherein the organic compound is in a mono-derivatised form.

14. A composition as in claim 12, wherein the organic compound is covalently bonded to the monolith.

15. An apparatus for providing an ionized analyte for mass analysis by photon desorption, said apparatus comprising:

a target carrying a non-matrix composition having at least one of particles or a monolith, wherein at least one of said particles or monolith are modified with an organic compound capable of absorbing photons having a wave-length of at least 300 nm, wherein said analyte is not chemically linked to said organic compound, wherein said organic compound capable of absorbing photons having a wave-length of at least 300 nm is at least one of azodianilin, stilbene, or a derivative thereof.

16. The apparatus according to claim 15, wherein said particles or monolith are porous.

17. The apparatus according to claim 15, wherein the particles have a size in the range of about 0.5-100 μm.

18. The apparatus according to claim 15, wherein pores of the particles have a pore size in the range of about 60-4,000 Å.

19. The apparatus according to claim 15, wherein said particles or monolith are comprised of silica.

20. The apparatus according to claim 15, wherein said particles or monolith are made of at least one of cellulose, sugar, carbohydrates, agarose, dextran, derivatives thereof, an organic polymer, styrene, divinyl benzene and (meth)acrylate and derivatives thereof, $TiO_2$, $ZrO_2$, $In_2O_3$ and diamond.

21. A method for providing an ionized analyte for analysis of mass comprising:

providing an apparatus, the apparatus including a target carrying a non-matrix composition having at least one of particles or a monolith, wherein at least one of said particles or monolith is modified with an organic compound capable of absorbing photons having a wave-length of at least 300 nm, wherein said analyte is not chemically linked to said organic compound; wherein said organic compound capable of absorbing photons having a wave-length of at least 300 nm is at least one of azodianilin, stilbene, or a derivative thereof;

contacting an amount of said analyte with at least one of said particles or monolith; and irradiating at least one of said particles or said monolith to desorb and ionize said analyte.

* * * * *